Sept. 9, 1930.  F. E. NOISWORTHY  1,775,599
COMBINED BOLL COTTON BEATING, CLEANING, VACUUM, AND DROPPING MACHINE
Filed Aug. 29, 1929  2 Sheets-Sheet 1
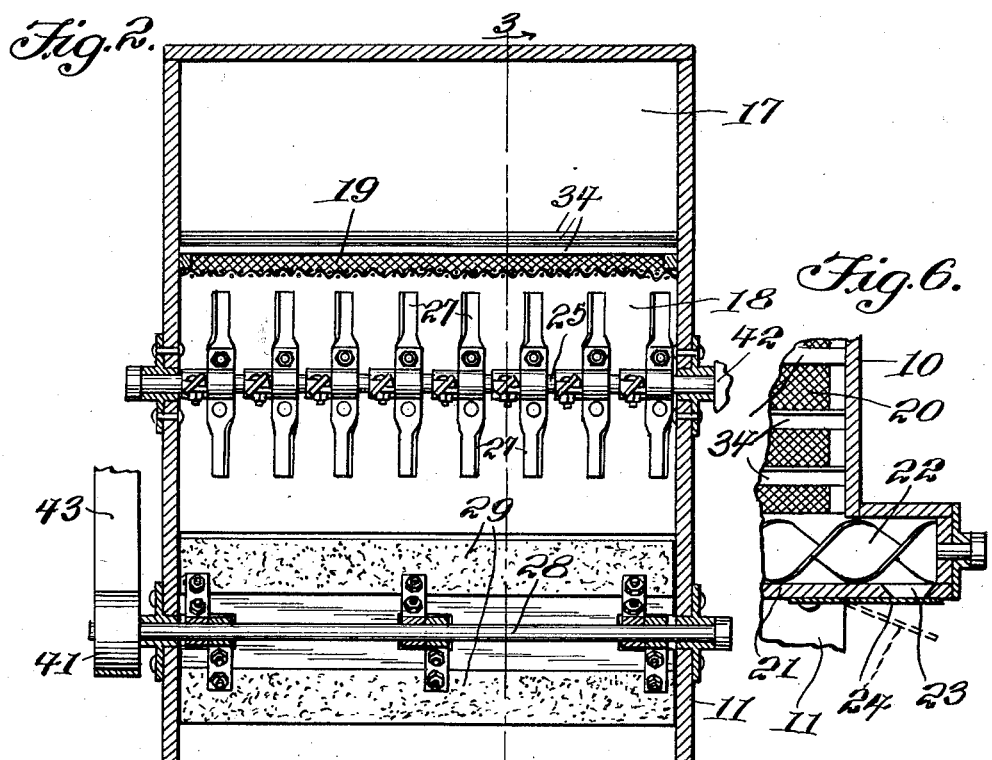
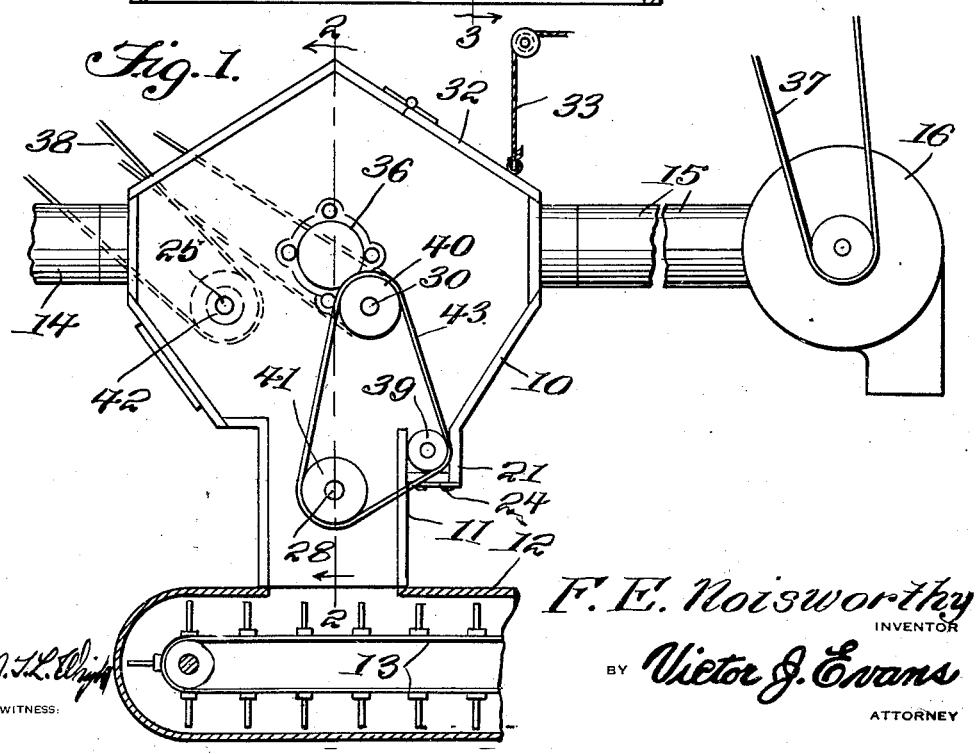
F. E. Noisworthy
INVENTOR
BY Victor J. Evans
ATTORNEY
WITNESS:

Sept. 9, 1930.  F. E. NOISWORTHY  1,775,599
COMBINED BOLL COTTON BEATING, CLEANING, VACUUM, AND DROPPING MACHINE
Filed Aug. 29, 1929  2 Sheets-Sheet 2
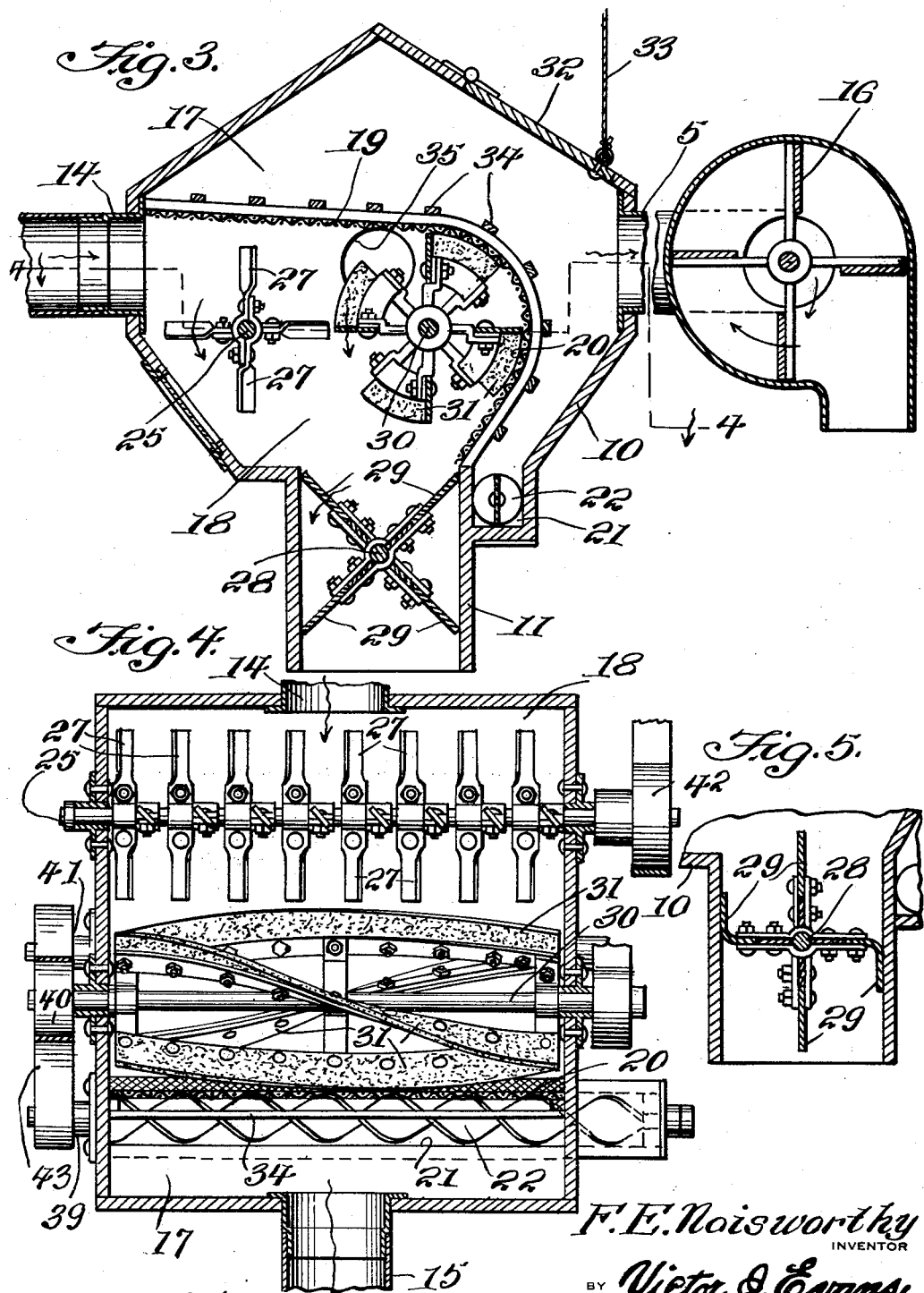
F. E. Noisworthy
INVENTOR
BY Victor J. Evans
ATTORNEY Patented Sept. 9, 1930

1,775,599

UNITED STATES PATENT OFFICE

FREDERICK EUGENE NOISWORTHY, OF WYATT, MISSOURI, ASSIGNOR OF ONE-HALF TO ALVIS TAYLOR MARSHALL, OF WYATT, MISSOURI

COMBINED BOLL-COTTON BEATING, CLEANING, VACUUM, AND DROPPING MACHINE

Application filed August 29, 1929. Serial No. 389,269.

This invention contemplates the provision of a machine for dealing with cotton, prior to conveying the latter into a gin, the machine operating to beat and break up the cotton, and effectively remove the dirt and other foreign matter therefrom, and subsequently drop the cotton into a suitable conveyor which carries it to the gin, whereby the output of the latter can be very materially increased, and the wear on the gin minimized.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the machine constituting the subject matter of the present invention.

Figure 2 is a sectional view on line 2—2 of Figure 1.

Figure 3 is a sectional view on line 3—3 of Figure 2.

Figure 4 is a sectional view on line 4—4 of Figure 3.

Figure 5 is a fragmentary sectional view of the rotatable valve which controls the discharge of the cotton from the machine.

Figure 6 is a fragmentary sectional view showing the valve controlled outlet for the dirt and other foreign matter.

Referring to the drawings in detail 10 indicates a casing in which the operating mechanism of the machine is arranged, and this casing can be constructed from any suitable material and also vary in size and configuration without departing from the inventive idea. The casing is formed with a depending outlet tubular portion 11 which communicates with the housing 12 in which an endless conveyor operates, so that after the cotton has been dealt with in the machine, it passes therefrom onto the conveyor and is carried to the gin not shown.

One side of the casing is provided with an inlet pipe 14, through which the cotton is drawn into the machine by suction, for which purpose the opposite side of the casing is provided with a suction pipe 15 and a suction fan indicated generally at 16. Located within the casing 10 is a partition of some suitable foraminated material, such as screening, and this partition divides the casing 10 into two compartments, one indicated at 17 and the other at 18. It will be observed from an inspection of Figure 3 that this partition includes a horizontal portion 19 which projects an appreciable distance within the casing from a point directly above the inlet pipe 14, and the partition is then curved downwardly as at 20 and terminates at the upper edge of the depending outlet tubular portion 11 of the casing. The casing is also provided with a trough 21 formed at one side of the casing, and communicates with the compartment 17, and this trough 21 is adapted to receive the dirt and other foreign matter separated from the cotton in a manner to be presently described. Operating in this trough 21 is a screw conveyor 22 which forces the dirt and other foreign matter toward one end of the trough, from which it passes through an outlet opening 23 which is normally closed by a flap valve 24. This valve is normally maintained in its closed position by the suction created within the casing 10, but can be forced open by the dirt and other foreign matter to allow its escape from the machine.

Journaled in the compartment 18 immediately adjacent the inlet pipe 14 is what I term a beater, including a shaft 25 from which radiates a plurality of beater arms as pairs, with the arms of each pair indicated illustrated. These arms are arranged in pairs, with the arms of each pair indicated at 27 projecting from opposite sides of the shaft, while the alternate pairs of arms are arranged at right angles to the adjacent arms as clearly illustrated in Figure 4. It will also be noted that the beater arms are twisted and arranged at an angle to the shaft 25. This construction serves to effectively beat and break up the cotton as it enters the casing 10, the beater being rotated at the proper speed to effectively accomplish this result, the speed of the beater depending upon the grade of cotton being dealt with. Manifestly as the cotton is being beaten and broken up in the manner just described, the dirt and other foreign matter separated therefrom is drawn through the screening 19 by the suction created within the casing 10, and this dirt, dust and other foreign matter then gravitates into the trough 21 and is carried from the machine by the screw conveyor 22 in the manner above described. The cotton after being beaten and broken up passes through the casing 10 into the depending tubular outlet portion 11 of the casing, and its discharge therefrom is regulated or controlled by a rotary gate valve mounted upon a shaft 28 and operating in the depending tubular portion 11 as clearly illustrated in Figures 3 and 5. This valve includes a plurality of flexible gates 29, preferably four in number which are so arranged that at least two of said gates always contact the walls of the tubular portion 11 to prevent air from entering the casing from the bottom while the cotton is being discharged onto the conveyor 13 above referred to. The cotton finds its way into the spaces between the adjacent gates 29 and as the valve is rotated, the cotton is deposited onto the conveyor 13 as will be readily understood.

In order to maintain the screen partition 19 unobstructed by dirt, dust and other foreign matter relieved from the cotton, I employ a cleaning device including a shaft 30 which is journaled in the compartment 18 at one side of the beating device above described. Supported on the shaft 30 is a plurality of spaced longitudinally disposed spiral plates 31, preferably constructed of rubber or some other soft material, arranged to contact the partition 19, continuously brushing the latter incident to the rotation of the shaft 30, and thereby maintaining the partition in a clean condition. This of course provides for a better suction through the partition and for the free and easy escape of the dirt and other foreign matter separated from the cotton incident to the beating operation. The casing is provided with a door 32 which can be partly opened by a suitable operating element 33 to vary or regulate the degree of suction within the casing while the partition 19 may also be provided with a plurality of slats 34 to control or regulate the amount of air passing through the screen. The casing is also provided with an opening 35 so that access may be had to the compartment 18 for any purpose whatsoever and this opening is normally closed by a plate or cover 36.

The suction fan 16 is operated by a belt 37 leading from any suitable source of power, while a similar belt 38 is employed to operate the beater shaft 25. As shown in Figure 1 the shaft of the screw conveyor 32 is provided with a pulley 39 while the shaft of the cleaning device is provided with a shaft 40, and a similar pulley 41 is carried by the shaft 28 of the rotary valve. Trained over all of these pulleys and a pulley 42 arranged on the end of the shaft 25 of the beater is an endless belt 43, so that all of the operating devices are simultaneously actuated from the power driven shaft 25 of the beater.

It is manifest that by use of the invention, the cotton conveyed into the machine is effectively dealt with, to not only break up the cotton, but to relieve it of dirt, dust and other foreign matter before it is conveyed to the gin, thereby allowing the latter to operate with greater efficiency and increased output, as well as to prolong the life of the gin machinery.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

In a cotton handling machine of the character described a casing of substantially rectangular contour in cross section having an inlet opening in one side wall thereof, an elongated portion depending from the bottom of the casing, and extending entirely across the latter to define an outlet opening, the walls of said depending portion extending above the bottom with one of said walls spaced from the adjacent side wall of the casing to define a transversely disposed trough, a partition of foraminated material dividing the casing into separate compartments and including a horizontally disposed portion leading from above the said inlet opening, and a depending curved portion reposing upon one wall of said outlet portion adjacent said trough, means for creating a suction within the casing to draw the cotton within one of said compartments, a shaft journaled in said compartment, a plurality of arms radiating from said shaft and operable to beat and break up the cotton as it enters the compartment and to move the cotton downwardly in the direction of the said outlet portion, the foreign matter separated from the cotton being drawn into the other compartment by the suction within the casing, and allowed to gravitate into said trough, means operating within the trough for conveying the foreign matter from the casing at one end thereof, a plurality of brushes rotatably mounted within the said first mentioned compartment for maintaining the foraminated partition in a clean condition, and means operating in the outlet portion of the casing to regulate the discharge of cotton therefrom and to prevent the admission of air into the casing and through said outlet portion.

In testimony whereof I affix my signature.

FREDERICK EUGENE NOISWORTHY.